United States Patent
Tanabe et al.

(10) Patent No.: US 12,155,411 B2
(45) Date of Patent: Nov. 26, 2024

(54) OPTICAL TRANSMISSION APPARATUS AND OPTICAL TRANSMISSION METHOD

(71) Applicant: NIPPON TELEGRAPH AND TELEPHONE CORPORATION, Tokyo (JP)

(72) Inventors: Akihiro Tanabe, Musashino (JP); Takashi Mitsui, Musashino (JP); Toshiaki Shitaba, Musashino (JP); Tomoaki Yoshida, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 105 days.

(21) Appl. No.: 17/910,919

(22) PCT Filed: Mar. 13, 2020

(86) PCT No.: PCT/JP2020/011167
§ 371 (c)(1),
(2) Date: Sep. 12, 2022

(87) PCT Pub. No.: WO2021/181671
PCT Pub. Date: Sep. 16, 2021

(65) Prior Publication Data
US 2023/0135622 A1 May 4, 2023

(51) Int. Cl.
*H04B 10/032* (2013.01)
*H04B 10/50* (2013.01)
(Continued)

(52) U.S. Cl.
CPC ......... *H04B 10/032* (2013.01); *H04B 10/614* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS 7,522,842 B1 * 4/2009 McNicol ............ H04B 10/2916
398/160
8,625,994 B2 * 1/2014 Archambault ...... H04J 14/0206
398/43
(Continued)

FOREIGN PATENT DOCUMENTS

JP   H11127090 A   5/1999
JP   201874477 A   5/2018

OTHER PUBLICATIONS

International Telecommunication Union, ITU-T J.185: Transmission equipment for transferring multi-channel television signals over optical access networks by frequency modulation conversion, Recommendation ITU-T J.185, Edition 2.0, Jun. 13, 2012.

*Primary Examiner* — Darren E Wolf
(74) *Attorney, Agent, or Firm* — Harness, Dickey & Pierce, P.L.C.

(57) ABSTRACT

An optical transmission apparatus includes an input unit, a demultiplexing unit, a measurement unit, and a switching unit. The input unit inputs a first multiplexed signal and a second multiplexed signal each obtained by multiplexing a plurality of optical signals having different wavelengths. The demultiplexing unit demultiplexes the first multiplexed signal and the second multiplexed signal by wavelength. The measurement unit measures qualities of a plurality of optical signals obtained by demultiplexing the first multiplexed signal and qualities of a plurality of optical signals obtained by demultiplexing the second multiplexed signal. The switching unit performs switching between the first multi-
(Continued)

plexed signal and the second multiplexed signal to be output to a subsequent stage based on a result of measurement by the measurement unit.

10 Claims, 10 Drawing Sheets

(51) Int. Cl.
*H04B 10/61* (2013.01)
*H04B 10/40* (2013.01)
*H04B 10/60* (2013.01)

(56) References Cited

U.S. PATENT DOCUMENTS

| | | | |
|---|---|---|---|
| 2004/0028406 A1* | 2/2004 | Bortz ................. | H04Q 11/0005 398/49 |
| 2009/0214215 A1* | 8/2009 | Li ...................... | H04B 10/2507 398/43 |
| 2013/0223794 A1* | 8/2013 | Boduch ............... | H04J 14/0208 385/24 |
| 2018/0131461 A1* | 5/2018 | Yoshida .............. | H04J 14/0247 |

* cited by examiner

OPTICAL TRANSMISSION APPARATUS AND OPTICAL TRANSMISSION METHOD

CROSS-REFERENCE TO RELATED APPLICATIONS

This application is a 371 U.S. National Phase of International Application No. PCT/JP2020/011167, filed on Mar. 13, 2020. The entire disclosure of the above application is incorporated herein by reference.

TECHNICAL FIELD

The present invention relates to an optical transmission apparatus and an optical transmission method.

BACKGROUND ART

As a video communication network system that delivers video to a house of a subscriber, there is known a system that performs relay broadcasting by using an optical signal. FIG. 7 is a diagram illustrating a configuration example of a video communication network system 900 using a technology in the related art. For example, a frequency modulation (FM) collective conversion method is used for the video communication network system 900 (see NPL 1). The video communication network system 900 includes, for example, a transmitter 910, a transmitter 911, one or more transmission apparatuses 920, one or more transmission apparatuses 921, a WDM filter 930, and a receiver 950 and a receiver 951 installed in a house of each subscriber or the like. While one receiver 950 and one receiver 951 are illustrated in the same figure, the number of houses of subscribers, and the number of receivers 950 and the number of receivers 951 in a house of each subscriber are arbitrary. The WDM filter 930 and the receiver 950 are connected via an access network 940. The access network 940 performs wavelength multiplexing transmission.

The transmitter 910 inputs a video signal of terrestrial digital broadcasting, or a video signal of broadcasting by broadcasting satellites (BS) or broadcasting by communication satellites (CS) which is delivered to the ground from a satellite using a right-hand circular polarization. In the following, the video signal is also described as a terrestrial digital/BSCS right-hand video signal. The transmitter 911 inputs a video signal of the BS broadcasting or the CS broadcasting that is delivered to the ground from a satellite using a left-hand circular polarization. This is a video signal for new 4K/8K satellite broadcasting. In the following, the video signal is also described as a BSCS left-hand video signal. Each of the transmitter 910 and the transmitter 911 collectively converts input multi-channel video signals into wideband FM signals and then converts the wideband FM signals into optical signals to output the optical signals. An optical signal SG90 having a wavelength λ1 (e.g., λ1 is 1558 nm) output by the transmitter 910 is relayed and transmitted by the transmission apparatus 920, and is then input to the WDM filter 930. An optical signal SG91 having a wavelength λ2 output by the transmitter 910 (e.g., λ2 is 1552 nm) is relayed and transmitted by the transmission apparatus 920, and is then input to the WDM filter 930. Note that in the current state, the number of channels for the left-hand circular polarization is small, and thus λ2=1558 nm is used.

The WDM filter 930 outputs a multiplexed signal SG92 obtained by multiplexing the optical signal SG90 for video relayed by the transmission apparatus 920, the optical signal SG91 for video relayed by the transmission apparatus 921, and an optical signal for communication input from a transmission apparatus (not illustrated) to the access network 940. The multiplexed signal SG92 transmitted in the access network 940 is demultiplexed, the receiver 950 receives a multiplexed signal SG93 for video having the wavelength λ1, and the receiver 951 receives a multiplexed signal SG94 for video having the wavelength λ2. Note that the receiver 950 and the receiver 951 cut signals having wavelengths other than a wavelength band supported by the receivers themselves with a filter.

CITATION LIST

Non Patent Literature

NPL 1: "ITU-T J.185: Transmission equipment for transferring multi-channel television signals over optical access networks by frequency modulation conversion," International Telecommunication Union, June 2012.

SUMMARY OF THE INVENTION

Technical Problem

In the video communication network system illustrated in FIG. 7, the terrestrial digital/BSCS right-hand video signal and the BSCS left-hand video signal are relayed in different systems. As a result, relay transmission equipment is required for each of the terrestrial digital/BSCS right-hand video signal and the BSCS left-hand video signal. As such, it is conceived to multiplex the terrestrial digital/BSCS right-hand video signal and the BSCS left-hand video signal using different wavelengths to transmit the multiplexed signal in one system. However, some video signals of video signals that have been multiplexed may be deteriorated, and video watched by a viewer may be interrupted.

In view of the above circumstances, an object of the present invention is to provide an optical transmission apparatus and an optical transmission method capable of transmitting a multiplexed signal obtained by multiplexing optical signals having different wavelengths with good quality.

Means for Solving the Problem

An aspect of the present invention is an optical transmission apparatus including: an optical input unit configured to input a first multiplexed signal obtained by multiplexing a plurality of optical signals having different wavelengths and a second multiplexed signal obtained by multiplexing a plurality of the optical signals having different wavelengths; a demultiplexing unit configured to demultiplex the first multiplexed signal and the second multiplexed signal by wavelength; a measurement unit configured to measure qualities of a plurality of optical signals obtained by demultiplexing the first multiplexed signal and qualities of a plurality of optical signals obtained by demultiplexing the second multiplexed signal; and a switching unit configured to perform switching between the first multiplexed signal and the second multiplexed signal to be output to a subsequent stage based on a result of measurement by the measurement unit.

An aspect of the present invention is an optical transmission method including: inputting a first multiplexed signal obtained by multiplexing a plurality of optical signals having different wavelengths and a second multiplexed signal obtained by multiplexing a plurality of the optical signals having different wavelengths; demultiplexing the first multiplexed signal and the second multiplexed signal by wavelength; measuring qualities of a plurality of optical signals obtained by demultiplexing the first multiplexed signal and qualities of a plurality of optical signals obtained by demultiplexing the second multiplexed signal; and performing switching between the first multiplexed signal and the second multiplexed signal to be output to a subsequent stage based on a result of measurement by the measuring.

Effects of the Invention

According to the present invention, it is possible to transmit a multiplexed signal obtained by multiplexing optical signals having different wavelengths with good quality.

DESCRIPTION OF EMBODIMENTS

Hereinafter, embodiments of the present invention will be described in detail with reference to the drawings. A redundant optical transmission system according to an embodiment has a redundant configuration in which a transmission signal is transmitted through a duplex transmission line. The transmission signal is a multiplexed signal obtained by multiplexing optical signals of a plurality of wavelength bands. In the redundant optical transmission system, a signal quality in each wavelength band before multiplexing of the transmission signal is measured and retained in advance internally or externally. The signal quality is represented, for example, by a level or a level difference. A signal selection apparatus of the redundant optical transmission system inputs two transmission signals transmitted through transmissions lines that have been duplexed, and demultiplexes each of the transmission signals into optical signals by wavelength. The signal selection apparatus detects presence or absence of deterioration in quality for each of the optical signals obtained by demultiplexing based on the retained information. When deterioration in quality is detected in one of the transmission signals, a switching unit of the signal selection apparatus selects and outputs the other of the transmission signals in which deterioration in quality has not been detected. As a result, it is possible to detect an abnormal condition more accurately than in signal transmission in a multiplexed state, and perform switching of the transmission signal to be output to a subsequent stage. Hereinafter, a case in which the redundant optical transmission system is a video communication network system that transmits a video signal will be described as an example.

First Embodiment

Figure 1:
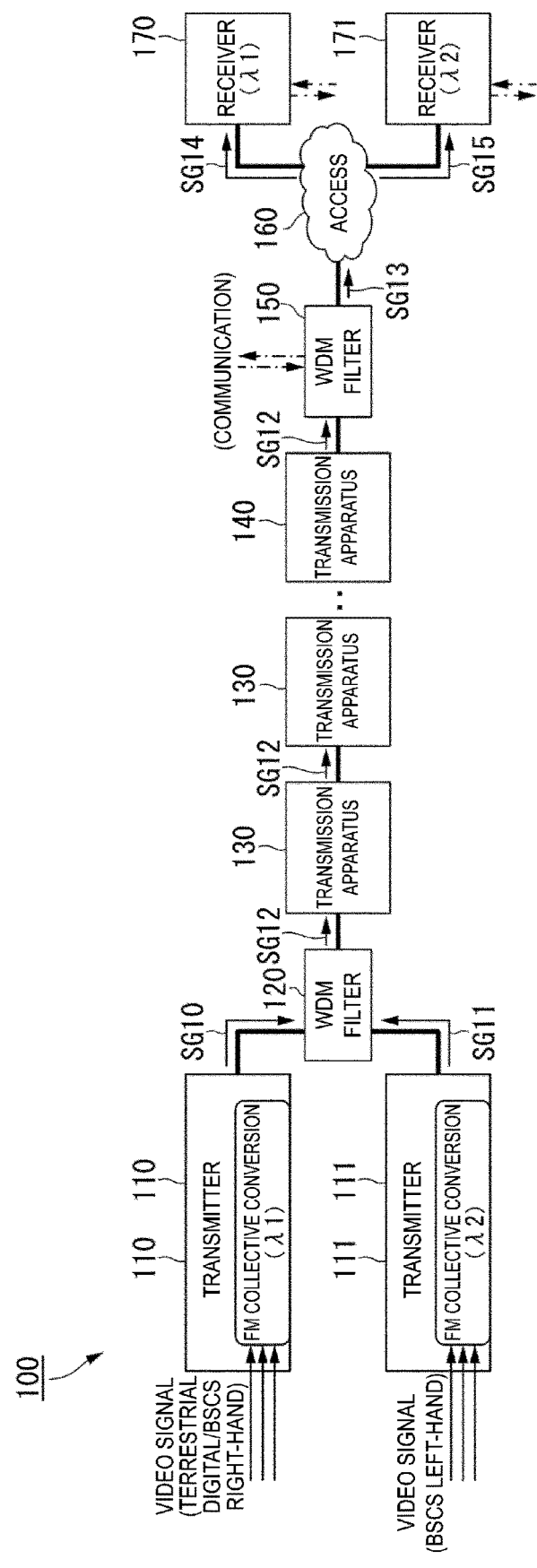
FIG. 1 is a diagram illustrating a configuration example of a video communication network system according to a first embodiment of the present invention.

FIG. 1 is a diagram illustrating a configuration example of a video communication network system 100 according to a first embodiment. The video communication network system 100 includes a transmitter 110, a transmitter 111, a WDM filter 120, one or more transmission apparatuses 130, a transmission apparatus 140, a WDM filter 150, and a receiver 170 and a receiver 171 installed in a house of each subscriber or the like. While one receiver 170 and one receiver 171 are illustrated in the same figure, the number of houses of subscribers, and the number of receivers 170 and the number of the receivers 171 in a house of each subscriber are arbitrary. The WDM filter 150, and the receiver 170 and receiver 171 are connected via an access network 160. The access network 160 performs wavelength multiplexing transmission. The transmitter 110, the transmitter 111, the access network 160, the receiver 170, and the receiver 171 are the same as the transmitter 910, the transmitter 911, the access network 940, the receiver 950, and the receiver 950 illustrated in FIG. 7.

Figure 7:
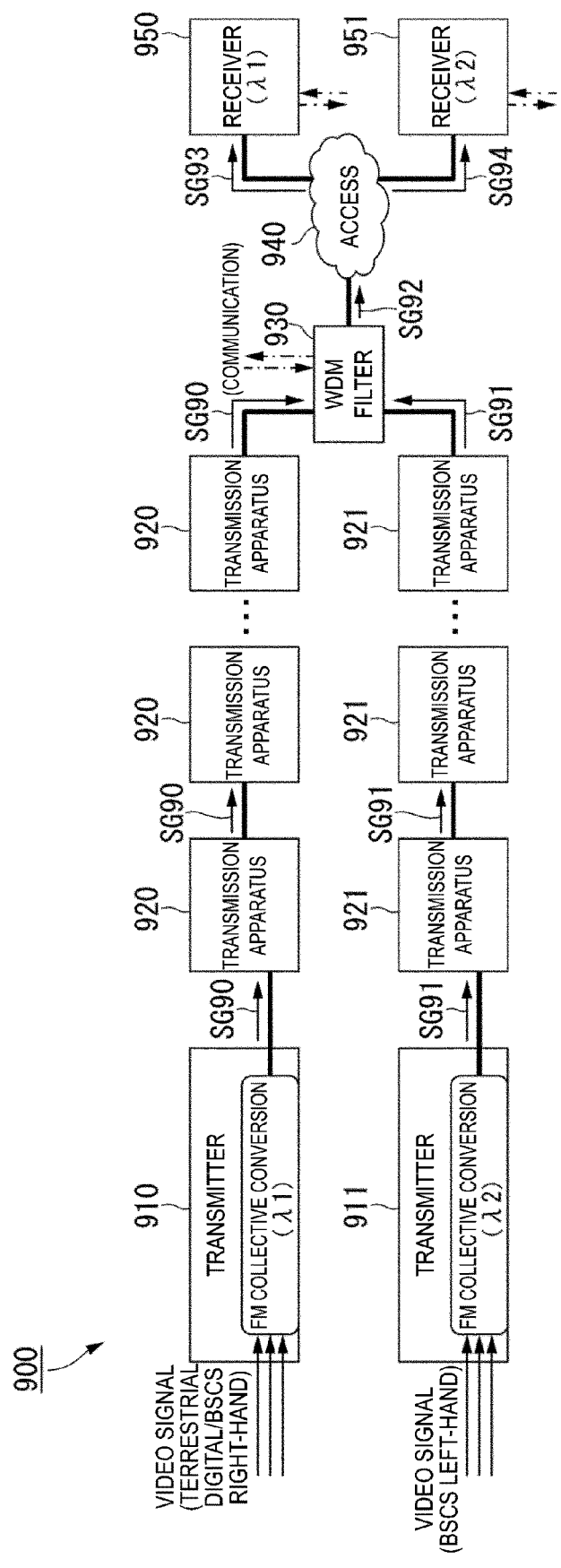
FIG. 7 is a diagram illustrating a configuration example of a video communication network system according to a technology in the related art.

Similarly to the transmitter 910 illustrated in FIG. 7, the transmitter 110 inputs a video signal of the terrestrial digital broadcasting or a video signal of the BS broadcasting or the CS broadcasting delivered to the ground from a satellite using the right-hand circular polarization, and collectively converts the video signal into a wideband FM signal. The transmitter 110 converts the collectively converted FM signal into an optical signal SG10 having a wavelength λ1 and inputs the optical signal SG10 to the WDM filter 120. Similarly to the transmitter 910 illustrated in FIG. 7, the transmitter 111 inputs a video signal of the BS broadcasting or the CS broadcasting delivered to the ground from a satellite using the left-hand circular polarization, and collectively converts the video signal into a wideband FM signal. The transmitter 111 converts the collectively converted FM signal into an optical signal SG11 having a wavelength λ2 and inputs the optical signal SG11 to the WDM filter 120.

The WDM filter 120 multiplexes the optical signal SG10 having the wavelength λ1 input from the transmitter 110 and the optical signal SG11 having the wavelength λ2 input from the transmitter 111, and outputs a multiplexed signal SG12. The multiplexed signal SG12 output by the WDM filter 120 is relayed and transmitted by the one or more transmission apparatuses 130 and the transmission apparatus 140, and is then input to the WDM filter 150.

The WDM filter 150 multiplexes the multiplexed signal SG12 input from the transmission apparatus 140 and an optical signal for communication input from a transmission apparatus (not illustrated), and outputs a multiplexed signal SG13 to the access network 160. The multiplexed signal SG13 transmitted in the access network 160 is demultiplexed, the receiver 170 receives an optical signal SG14 for video having the wavelength λ1, and the receiver 171 receives an optical signal SG15 for video having the wavelength λ2.

Figure 2:
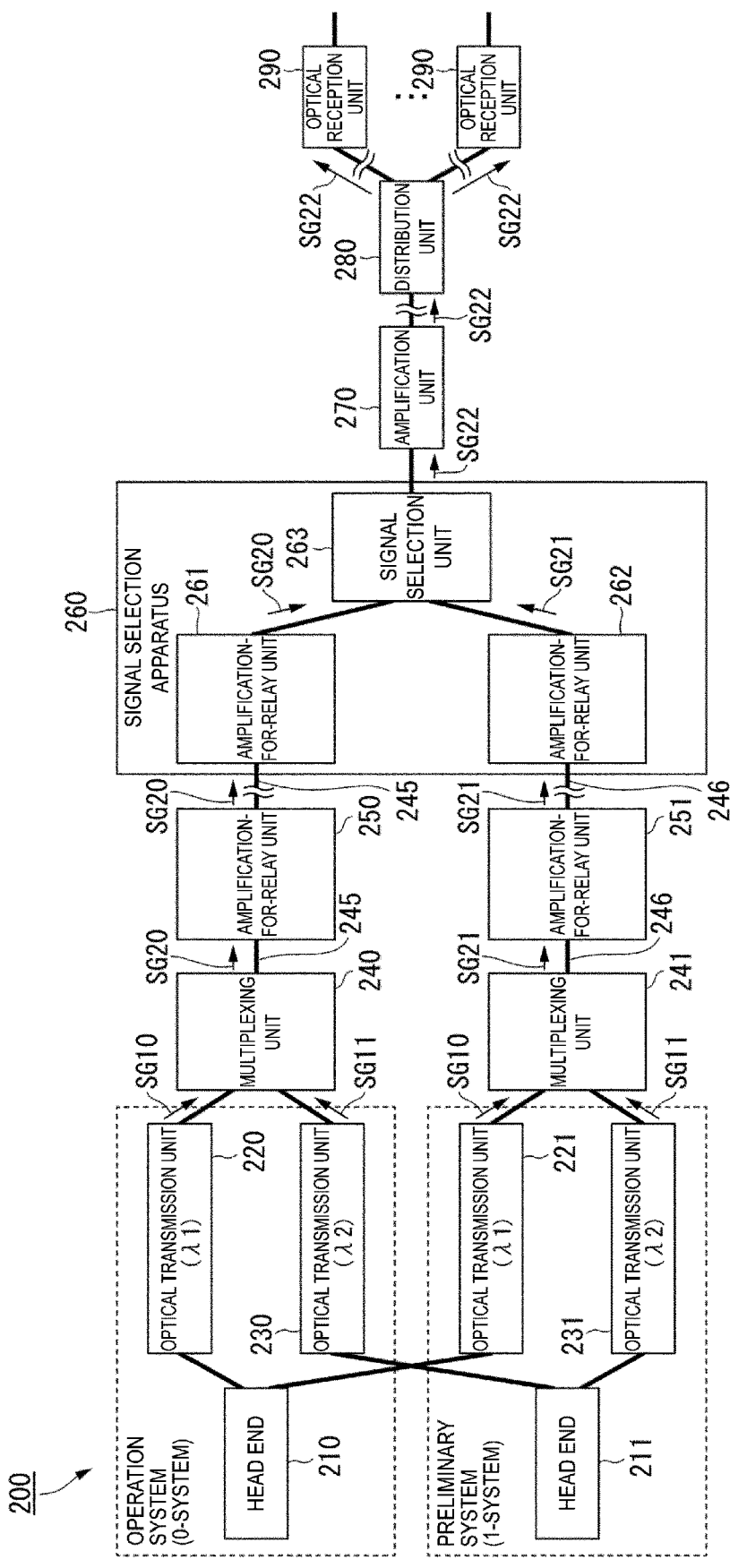
FIG. 2 is a diagram illustrating a configuration of an optical transmission system according to the first embodiment.

In the video communication network system 100, dual wavelength transmission from the WDM filter 120 to the WDM filter 150 is duplexed. With reference to FIG. 2, a configuration of the duplexed dual wavelength transmission applied to the video communication network system 100 will be described.

FIG. 2 is a diagram illustrating a configuration of an optical transmission system 200 according to the present embodiment. The optical transmission system 200 includes a head end 210, a head end 211, an optical transmission unit 220, an optical transmission unit 221, an optical transmission unit 230, an optical transmission unit 231, a multiplexing unit 240, a multiplexing unit 241, one or more amplification units for relay 250, one or more amplification units for relay 251, a signal selection apparatus 260, one or more amplification units 270, one or more distribution units 280, and one or more optical reception units 290. A 0-system is an operation system, and a 1-system is a preliminary system. The head end 210, the optical transmission unit 220, and the optical transmission unit 230 are operation systems. The head end 211, the optical transmission unit 221, and the optical transmission unit 231 are preliminary systems.

The head end 210, the optical transmission unit 220, and the optical transmission unit 221 correspond to the transmitter 110 illustrated in FIG. 1, and the head end 211, the optical transmission unit 230, and the optical transmission unit 231 correspond to the transmitter 111 illustrated in FIG. 1. The multiplexing unit 240 and the multiplexing unit 241 correspond to the WDM filter 120 illustrated in FIG. 1. The amplification-for-relay unit 250 may be the transmission apparatus 130 illustrated in FIG. 1, or may be an amplifier connected to the transmission apparatus 130. The signal selection apparatus 260 corresponds to the transmission apparatus 140 illustrated in FIG. 1. The amplification unit 270 is connected to a preceding stage of the WDM filter 150 illustrated in FIG. 1, and the distribution unit 280 is connected to a subsequent stage of the WDM filter 150 illustrated in FIG. 1. The optical reception units 290 correspond to the receiver 170 and the receiver 171 illustrated in FIG. 1.

The head end 210 receives, by radio waves, a video signal of the terrestrial digital broadcasting transmitted from a broadcast station, or a video signal of the BS broadcasting or the CS broadcasting delivered to the ground from a satellite using the right-hand circular polarization. Wavelengths of video signals are different for each channel. The head end 210 converts a video signal of each channel into an electrical signal and transmits the electrical signal to the optical transmission unit 220 and the optical transmission unit 221. The optical transmission unit 220 and the optical transmission unit 221 each convert the received electrical signal of each channel into the optical signal SG10 having the wavelength λ1. FM collective conversion is used for the conversion. The optical transmission unit 220 outputs the optical signal SG10 after conversion to the multiplexing unit 240, and the optical transmission unit 221 outputs the optical signal SG10 after conversion to the multiplexing unit 241.

The head end 211 receives, by radio waves, a video signal of the new 4K/8K satellite broadcasting transmitted from the broadcast station. Wavelengths of video signals are different for each channel. head end 211 converts a video signal of each channel into an electrical signal and transmits the electrical signal to the optical transmission unit 230 and the optical transmission unit 231. The optical transmission unit 230 and the optical transmission unit 231 each convert the received electrical signal of each channel into the optical signal SG11 having the wavelength λ2. FM collective conversion is used for the conversion. The optical transmission unit 230 outputs the optical signal SG11 after conversion to the multiplexing unit 240, and the optical transmission unit 231 outputs the optical signal SG11 after conversion to the multiplexing unit 241.

The multiplexing unit 240 multiplexes the optical signal SG10 having the wavelength λ1 received from the optical transmission unit 220 and the optical signal SG11 having the wavelength λ2 received from the optical transmission unit 230, and outputs a 0-system multiplexed signal SG20 to the transmission line 245. The multiplexed signal SG20 of the optical signals is amplified in the one or more amplification units for relay 250 provided in the transmission line 245, and relayed to a subsequent stage.

The multiplexing unit 241 multiplexes the optical signal SG10 having the wavelength λ1 received from the optical transmission unit 221 and the optical signal SG11 having the wavelength λ2 received from the optical transmission unit 231, and outputs a 1-system multiplexed signal SG21 to the transmission line 246. The multiplexed signal SG21 of the optical signals is amplified in the one or more amplification units for relay 251 provided in the transmission line 246, and relayed to a subsequent stage.

The signal selection apparatus 260 is an example of the optical transmission apparatus. The signal selection apparatus 260 includes an amplification-for-relay unit 261, an amplification-for-relay unit 262, and a signal selection unit 263. The amplification-for-relay unit 261 amplifies the 0-system multiplexed signal SG20 transmitted through the transmission line 245 and outputs the amplified 0-system multiplexed signal SG20 to the signal selection unit 263. The amplification-for-relay unit 262 amplifies the 1-system multiplexed signal SG21 transmitted through the transmission line 246 and outputs the amplified 1-system multiplexed signal SG21 to the signal selection unit 263. The signal selection unit 263 selects either the multiplexed signal SG20 or the multiplexed signal SG21, and outputs the selected signal as a multiplexed signal SG22 to a subsequent stage.

The amplification unit 270 amplifies the multiplexed signal SG22 output by the signal selection apparatus 260 and outputs the amplified multiplexed signal SG22 to the access network. The distribution unit 280 distributes the multiplexed signal SG22 received via the access network. The optical reception unit 290 receives the multiplexed signal SG22 distributed by the distribution unit 280 and receives the optical signal SG10 having the wavelength λ1 or the optical signal SG11 having the wavelength λ2 multiplexed into the multiplexed signal SG22.

Figure 8:
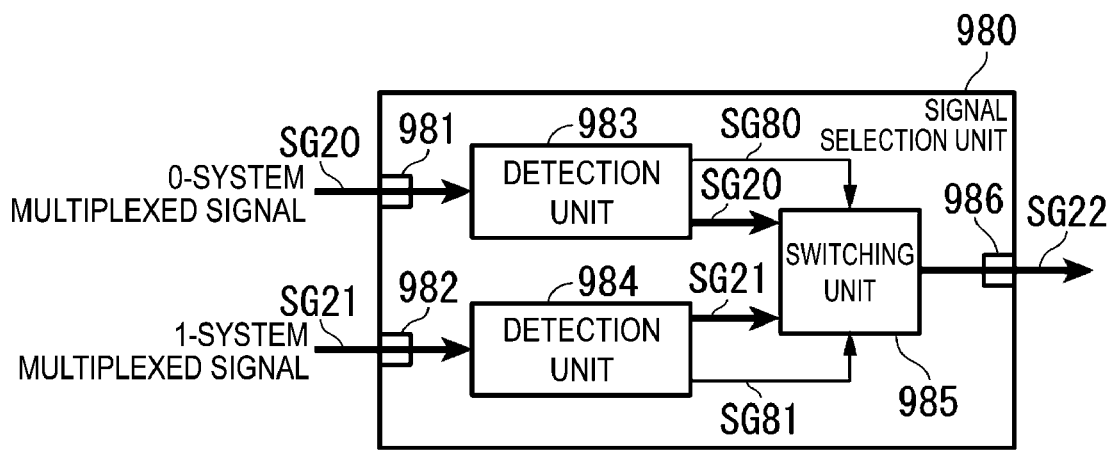
FIG. 8 is a diagram illustrating a configuration example of a signal selection unit according to the technology in the related art.

Here, a signal selection unit using a technology in the related art will be described. FIG. 8 is a diagram illustrating a configuration example of a signal selection unit 980 according to the technology in the related art. The signal selection unit 980 includes an optical input unit 981, an optical input unit 982, a detection unit 983, a detection unit 984, a switching unit 985, and an optical output unit 986. The optical input unit 981 inputs the 0-system multiplexed signal SG20, and the optical input unit 982 inputs the 1-system multiplexed signal SG21. The detection unit 983 is configured to perform processing of outputting the 0-system multiplexed signal SG20 input by the optical input unit 981 to the switching unit 985, and processing of, when a level reduction of the 0-system multiplexed signal SG20 is detected, outputting a switching request signal SG80 for switching to the 1-system to the switching unit 985. The detection unit 983 is configured to perform processing of outputting the 1-system multiplexed signal SG21 input by the optical input unit 982 to the switching unit 985 and processing of, when a level reduction of the 1-system multiplexed signal SG21 is detected, outputting a switching request signal SG81 for switching to the 0-system to the switching unit 985. The switching request signal SG80 and the switching request signal SG81 each are a control signal.

When receiving the switching request signal SG80 for switching to the 1-system, the switching unit 985 outputs the 1-system multiplexed signal SG21 to the optical output unit 986. When receiving the switching request signal SG81 for switching to the 0-system, the switching unit 985 outputs the 0-system multiplexed signal SG20 to the optical output unit 986. The optical output unit 986 outputs the 0-system multiplexed signal SG20 or the 1-system multiplexed signal SG21 output by the switching unit 985 as the multiplexed signal SG22 to a subsequent stage. Note that the signal selection unit 980 may implement a level adjustment function, but the level adjustment function is omitted in FIG. 8.

The multiplexed signal SG20 and the multiplexed signal SG21 each are a signal obtained by multiplexing the optical signal SG10 having the wavelength $\lambda 1$ and the optical signal SG11 having the wavelength $\lambda 2$. The detection unit 983 detects a level reduction in the multiplexed signal SG20, and the detection unit 984 detects a level reduction in the multiplexed signal SG21. However, neither the detection unit 983 nor the detection unit 984 can detect which of the optical signal SG10 having the wavelength $\lambda \backslash 1$ and the optical signal SG11 having the wavelength $\lambda 2$ is abnormal.

Figure 9:
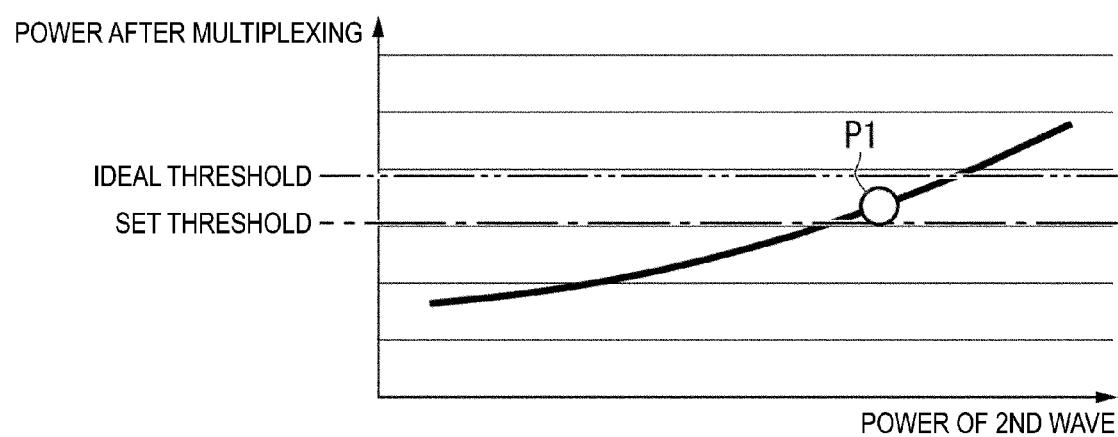
FIG. 9 is a diagram illustrating a relationship between a power of a multiplexed signal and powers of optical signals that are multiplexed.
Figure 10:
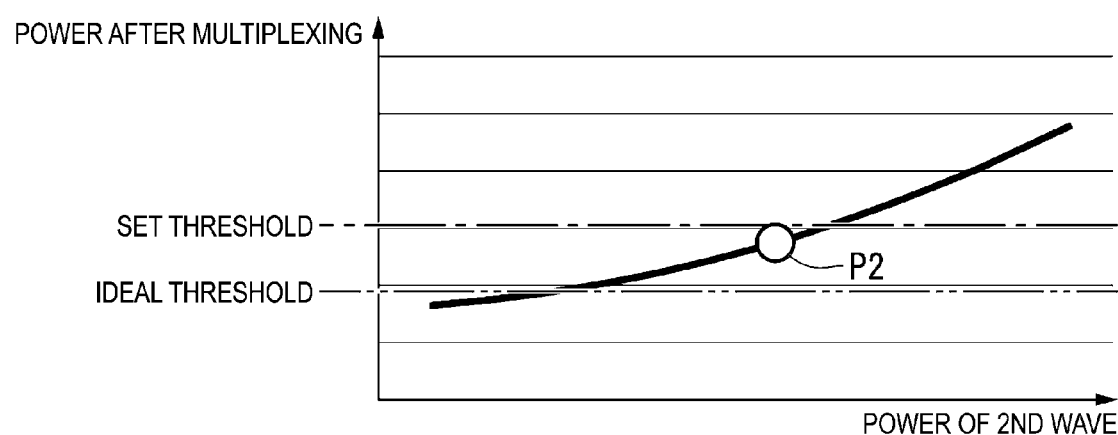
FIG. 10 is a diagram illustrating a relationship between a power of a multiplexed signal and powers of optical signals that are multiplexed.

FIG. 9 and FIG. 10 each illustrate a relationship between a power of a multiplexed signal obtained by multiplexing two optical signals and a power of a second optical signal that is multiplexed into the multiplexed signal. A threshold of signal deterioration is given for the power after multiplexing and not given for a power of each wavelength. As such, it is conceivable that switching due to a power reduction of one of the two optical signals is actually unnecessary or vice versa. An ideal threshold is a value based on a condition in which there is no deterioration in power for each of the two optical signals. At this time, as illustrated in FIG. 9, if a set threshold is lower than the ideal threshold, when a power after multiplexing is a value of P1 exceeding the set threshold, switching may not be performed even when the power of the second optical signal is low. Furthermore, as illustrated in FIG. 10, if the set threshold is higher than the ideal threshold, when the power after multiplexing is a value of P2 smaller than the set threshold, switching may be performed even when there is no problem in the power of the second optical signal.

In the related art, in a transmission system having a plurality of transmission lines, in which optical signals of a plurality of wavelength bands are multiplexed in each transmission line to be transmitted through one optical fiber, when the switching unit switches the transmission lines, no processing is performed to demultiplex the multiplexed signal in the transmission system into optical signals having original wavelengths. Typically, demultiplexing is performed before an access or at an optical network unit (ONU) at an end of an access section. Thus, the signal selection unit in the related-art technology detects a level reduction in the multiplexed signal as described above. This makes it difficult to accurately set the threshold of the level reduction for each wavelength. As a result, switching may not occur in the vicinity of the threshold, or conversely, even when switching is not required, switching may occur.

The signal selection unit according to the present embodiment demultiplexes the multiplexed signal back to signals having the original wavelengths, and then performs level measurement and level reduction detection of the optical signals for determination of switching. The signal selection unit measures a level and detects a level reduction for each wavelength, and can thus detect deterioration of a signal having an individual wavelength more accurately than measuring a level and detecting a level reduction for the multiplexed signal as is. Thus, it is possible to improve a determination accuracy of the switching processing.

Figure 3:
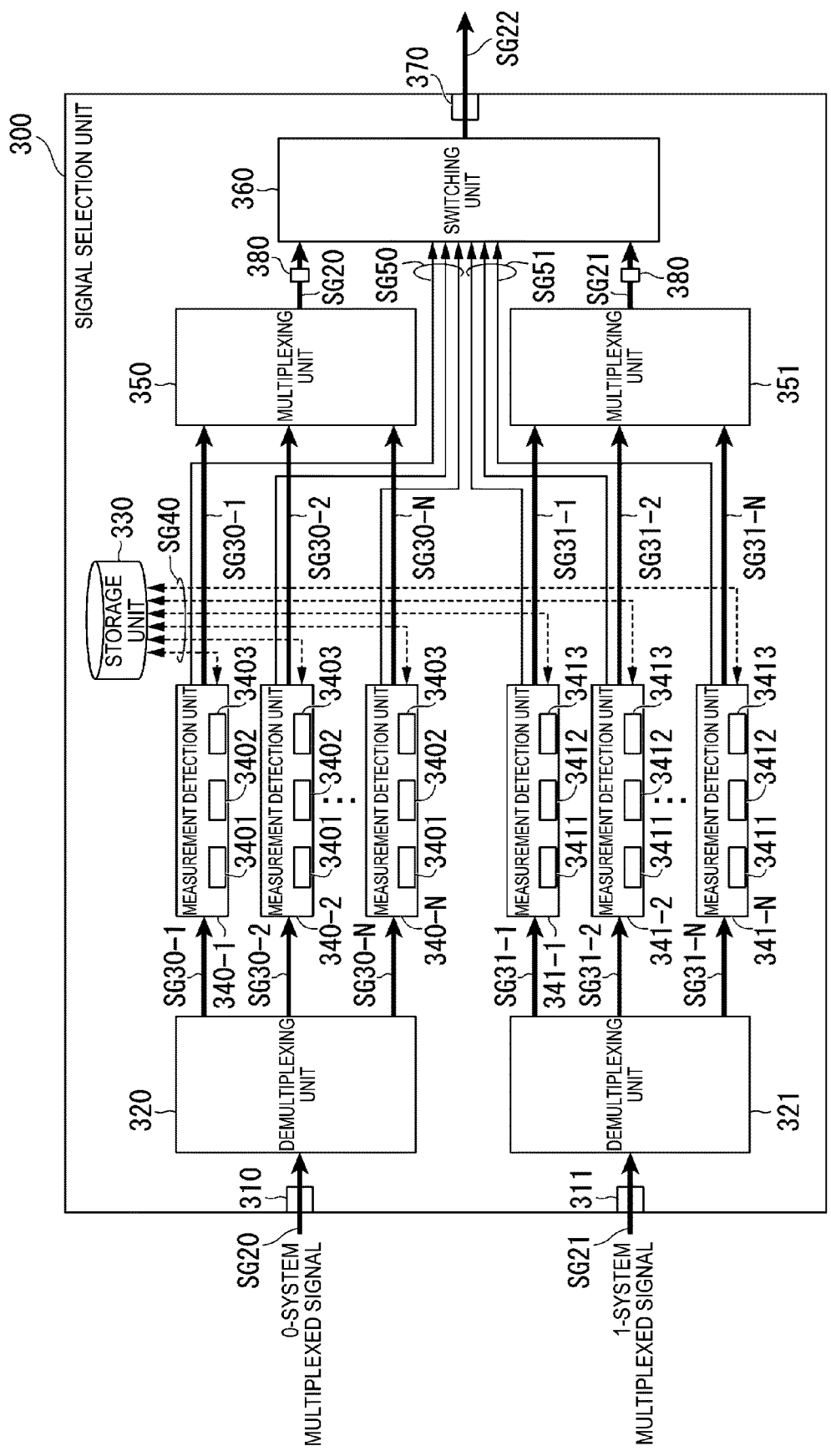
FIG. 3 is a diagram illustrating a configuration example of a signal selection unit according to the first embodiment.

FIG. 3 is a diagram illustrating a detailed configuration of a signal selection unit 300 of the present embodiment. The signal selection unit 300 illustrated in FIG. 3 is used as the signal selection unit 263 included in the signal selection apparatus 260 illustrated in FIG. 2. The signal selection unit 300 includes an optical input unit 310, an optical input unit 311, a demultiplexing unit 320, a demultiplexing unit 321, a storage unit 330, measurement detection units 340-1 to 340-N (N is an integer of 2 or greater), measurement detection units 341-1 to 341-N (N is an integer of 2 or greater), a multiplexing unit 350, a multiplexing unit 351, a switching unit 360, and an optical output unit 370.

The optical input unit 310 inputs the 0-system multiplexed signal SG20, and the optical input unit 311 inputs the 1-system multiplexed signal SG21. The demultiplexing unit 320 demultiplexes the 0-system multiplexed signal SG20 into N optical signals having different wavelengths SG30-1 to SG30-N. The demultiplexing unit 320 outputs the optical signal SG30-$n$ ($n$ is an integer of 1 or greater and N or less) to the measurement detection unit 340-$n$. The demultiplexing unit 321 demultiplexes the 1-system multiplexed signal SG21 into N optical signals having different wavelengths SG31-1 to SG31-N. The demultiplexing unit 321 outputs the optical signal SG31-$n$ ($n$ is an integer of 1 or greater and N or less) to the measurement detection unit 341-$n$.

The storage unit 330 stores a setting table in advance. The setting table indicates thresholds of optical signal levels of wavelengths required for detection for performing switching. The thresholds of the optical signal levels for the N wavelengths are described as optical signal level thresholds P(1) to P(N). The measurement detection units 340-1 to 340-N and 341-1 to 341-N, by using a control signal SG40, reads information from the storage unit 330.

The measurement detection unit 340-$n$ includes a measurement unit 3401, a detection unit 3402, and an instruction unit 3403. The measurement unit 3401 measures an optical signal level M0($n$) of the input optical signal SG30-$n$, and outputs the optical signal SG30-$n$ after measurement to the multiplexing unit 350. The detection unit 3402 reads the optical signal level threshold P(n) stored in the storage unit 330 and compares it to the optical signal level M0($n$). When M0($n$)$\leq$P(n) or M0($n$)<P(n) is satisfied, the detection unit 3402 detects deterioration in quality. When the detection unit 3402 detects deterioration in quality, the instruction unit 3403 outputs a switching instruction SG50 for switching to the 1-system to the switching unit 360. The switching instruction SG50 is a control signal.

The measurement detection unit 341-$n$ includes a measurement unit 3411, a detection unit 3412, and an instruction unit 3413. The measurement unit 3411 measures an optical signal level M1($n$) of the input optical signal SG31-$n$, and outputs the optical signal SG31-$n$ after measurement to the multiplexing unit 351. The detection unit 3412 reads the optical signal level threshold P(n) stored in the storage unit 330 and compares it to the optical signal level M1($n$). When M1($n$)$\leq$P(n) or M1($n$)<P(n) is satisfied, the detection unit 3412 detects deterioration in quality. When the detection unit 3412 detects deterioration in quality, the instruction unit 3413 outputs a switching instruction SG51 for switching to the 0-system to the switching unit 360. The switching instruction SG51 is a control signal.

The multiplexing unit 350 inputs the optical signals SG30-1 to SG30-N from the measurement detection units 340-1 to 340-N, respectively. The multiplexing unit 350 outputs the multiplexed signal SG20 obtained by multiplexing the optical signals SG30-1 to SG30-N to the switching unit 360.

The multiplexing unit 351 inputs the optical signals SG31-1 to SG31-N from the measurement detection units 341-1 to 341-n, respectively. The multiplexing unit 351 outputs the multiplexed signal SG21 obtained by multiplexing the optical signals SG31-1 to SG31-N to the switching unit 360.

When receiving the switching instruction, the switching unit 360 performs switching between the multiplexed signal SG20 and the multiplexed signal SG21 to be output. When receiving the switching instruction SG50 for switching to the 1-system from at least one of the measurement detection units 340-1 to 340-N, the switching unit 360 selects the multiplexed signal SG21 and outputs the selected multiplexed signal SG21 to the optical output unit 370. When receiving the switching instruction SG51 for switching to the 0-system from at least one of the measurement detection units 341-1 to 341-N, the switching unit 360 selects the multiplexed signal SG20 and outputs the selected multiplexed signal SG20 to the optical output unit 370. The optical output unit 370 outputs the multiplexed signal SG20 or the multiplexed signal SG21 output from the switching unit 360 as the multiplexed signal SG22 to a subsequent stage.

Note that the storage unit 330 may be provided in an apparatus outside the signal selection apparatus 260, or may be provided outside the signal selection unit 300 in the signal selection apparatus 260. Furthermore, some of the functions of the measurement detection units 340-1 to 340-N and 341-1 to 341-N, and the storage unit 330 may be included in an apparatus outside the signal selection unit 300 or the signal selection apparatus 260. For example, an external control apparatus that monitors and controls the video communication network system 100 or the optical transmission system 200 may have some of the functions of the measurement detection units 340-1 to 340-N and 341-1 to 341-N. In this case, the control apparatus may include the detection units 3402 and the instruction units 3403 of the measurement detection units 340-1 to 340-N, and the detection units 3412 and the instruction units 3413 of the measurement detection units 341-1 to 341-N. The measurement detection unit 340-n measures the optical signal level $M0(n)$ of the optical signal SG30-n and notifies the control apparatus of the measured level, and the measurement detection unit 341-n measures the optical signal level $M1(n)$ of the optical signal SG31-n and notifies the control apparatus of the measured level. When $M0(n) \leq P(n)$ or $M0(n) < P(n)$ is satisfied, the control apparatus outputs the switching instruction SG50 for switching to the 1-system to the switching unit 360, and when $M1(n) \leq P(n)$ or $M1(n) < P(n)$ is satisfied, the control apparatus outputs the switching instruction SG51 for switching to the 0-system to the switching unit 360.

Note that in order to compensate for level reduction due to demultiplexing or multiplexing, the signal selection unit 300 may include a level adjustment unit (AMP) 380 that amplifies the multiplexed signal between the multiplexing unit 350 and the switching unit 360 and between the multiplexing unit 351 and the switching unit 360.

Second Embodiment

The signal selection apparatus according to the first embodiment demultiplexes a main signal output to a subsequent stage, performs level measurement, and then multiplexes the demultiplexed signals. A signal selection apparatus according to a present embodiment branches an input multiplexed signal, demultiplexes the branched multiplexed signal, and performs level measurement, so that multiplexing and demultiplexing of a main signal are not performed. Hereinafter, in the present embodiment, differences from the first embodiment will be mainly described.

Figure 4:
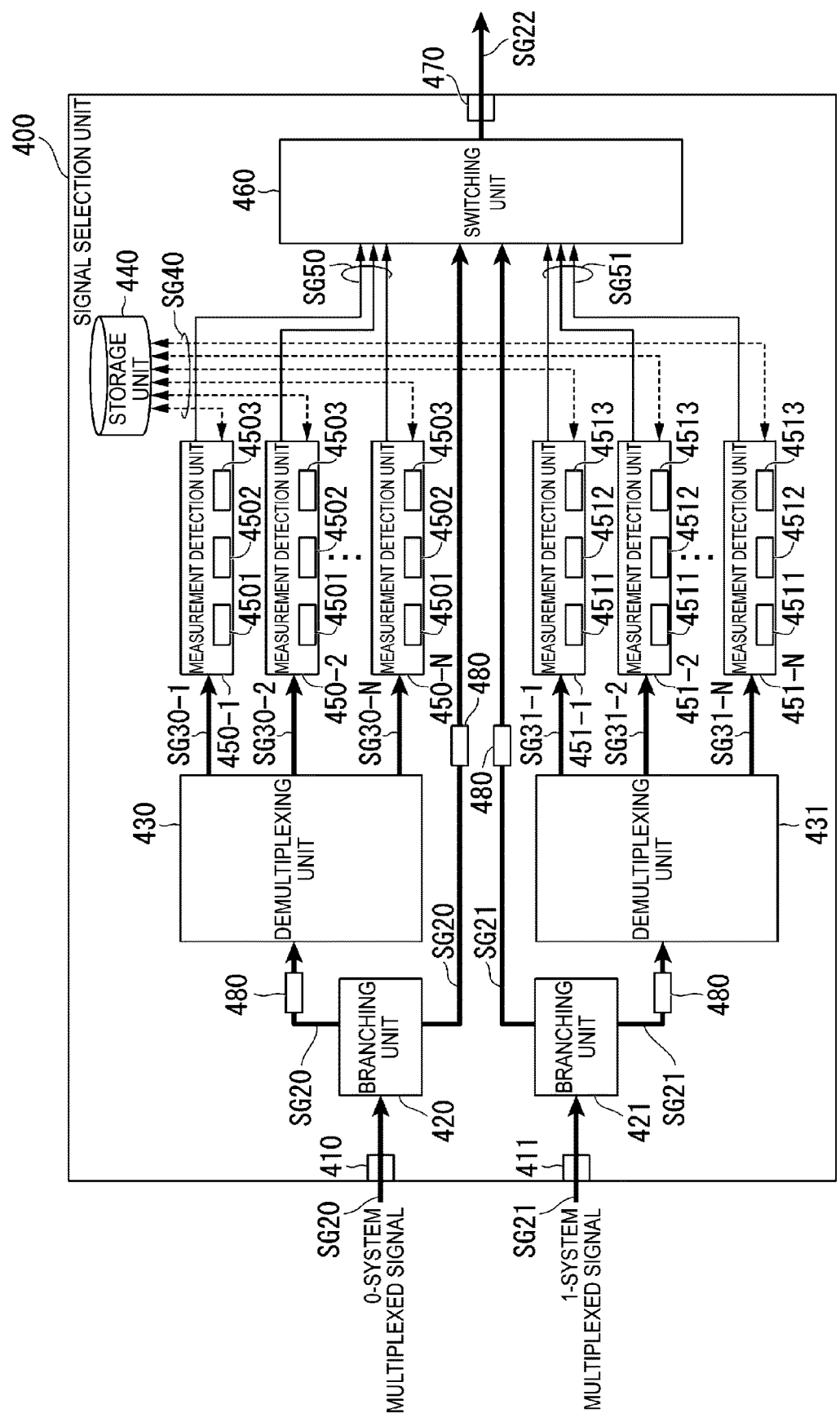
FIG. 4 is a diagram illustrating a configuration example of a signal selection unit according to a second embodiment.

FIG. 4 is a diagram illustrating a detailed configuration of a signal selection unit 400 according to the present embodiment. The signal selection unit 400 illustrated in FIG. 4 is used as the signal selection unit 263 included in the signal selection apparatus 260 illustrated in FIG. 2. The signal selection unit 400 includes an optical input unit 410, an optical input unit 411, a branching unit 420, a branching unit 421, a demultiplexing unit 430, a demultiplexing unit 431, a storage unit 440, measurement detection units 450-1 to 450-N (N is an integer of 2 or greater), measurement detection units 451-1 to 451-N, a switching unit 460, and an optical output unit 470.

The optical input unit 410 inputs a 0-system multiplexed signal SG20 and outputs the signal to the branching unit 420. The optical input unit 411 inputs a 1-system multiplexed signal SG21 and outputs the signal to the branching unit 421. The branching unit 420 branches the multiplexed signal SG20 input from the optical input unit 410. The branching unit 420 outputs the branched multiplexed signal SG20 to the demultiplexing unit 430, and outputs the multiplexed signal SG20 of the main signal to the switching unit 460. The branching unit 421 branches the multiplexed signal SG21 input from the optical input unit 411. The branching unit 421 outputs the branched multiplexed signal SG21 to the demultiplexing unit 431, and outputs the multiplexed signal SG21 of the main signal to the switching unit 460.

The demultiplexing unit 430 demultiplexes the 0-system multiplexed signal SG20 into optical signals SG30-1 to SG30-N having N wavelengths. The demultiplexing unit 430 outputs the optical signal SG30-n (n is an integer of 1 or greater and N or less) to the measurement detection unit 450-n. The demultiplexing unit 431 demultiplexes the 1-system multiplexed signal SG21 into optical signals SG31-1 to SG31-N having N wavelengths. The demultiplexing unit 431 outputs the optical signal SG31-n (n is an integer of 1 or greater and N or less) to the measurement detection unit 451-n.

The storage unit 440 stores a setting table similar to that of the storage unit 330 of the first embodiment illustrated in FIG. 3. The measurement detection units 450-1 to 450-N and 451-1 to 451-N, by using a control signal SG40, reads information from the storage unit 440.

The measurement detection unit 450-n includes a measurement unit 4501, a detection unit 4502, and an instruction unit 4503. The measurement unit 4501 measures an optical signal level $M0(n)$ of an input optical signal SG30-n. The detection unit 4502 reads an optical signal level threshold $P(n)$ stored in the storage unit 440 and compares it to the optical signal level $M0(n)$. When $M0(n) \leq P(n)$ or $M0(n) < P(n)$ is satisfied, the detection unit 4502 detects deterioration in quality. When the detection unit 4502 detects deterioration in quality, the instruction unit 4503 outputs a switching instruction SG50 for switching to the 1-system to the switching unit 460.

The measurement detection unit 451-*n* includes a measurement unit 4511, a detection unit 4512, and an instruction unit 4513. The measurement unit 4511 measures an optical signal level M1(*n*) of the input optical signal SG31-*n*. The detection unit 4512 reads the optical signal level threshold P(n) stored in the storage unit 440 and compares it to the optical signal level M1(*n*). When M1(*n*)≤P(n) or M1(*n*)<P(n) is satisfied, the detection unit 4512 detects deterioration in quality. When the detection unit 4512 detects deterioration in quality, the instruction unit 4513 outputs a switching instruction SG51 for switching to the 0-system to the switching unit 460.

When receiving the switching instruction SG50 for switching to the 1-system from at least one of the measurement detection units 450-1 to 450-N, the switching unit 460 selects the multiplexed signal SG21 input from the branching unit 421 and outputs the selected multiplexed signal SG21 to the optical output unit 470. When receiving the switching instruction SG51 for switching to the 0-system from at least one of the measurement detection units 451-1 to 451-N, the switching unit 460 selects the multiplexed signal SG20 input from the branching unit 420 and outputs the selected multiplexed signal SG20 to the optical output unit 470. The optical output unit 470 outputs the multiplexed signal SG20 or the multiplexed signal SG21 output from the switching unit 460 as a multiplexed signal SG22 to a subsequent stage.

Note that the storage unit 440 may be provided in an apparatus outside the signal selection apparatus 260, or may be provided outside the signal selection unit 400 in the signal selection apparatus 260. Furthermore, some of the functions of the measurement detection units 450-1 to 450-N and 451-1 to 451-N, and the storage unit 440 may be included in an apparatus outside the signal selection unit 400 or the signal selection apparatus 260. For example, an external control apparatus that monitors and controls the video communication network system 100 or the optical transmission system 200 may have some of the functions of the measurement detection units 450-1 to 450-N and 451-1 to 451-N. In this case, the control apparatus may include the detection units 4502 and the instruction units 4503 of the measurement detection units 450-1 to 450-N, and the detection units 4512 and the instruction units 4513 of the measurement detection units 451-1 to 451-N. The measurement detection unit 450-*n* measures the optical signal level M0(*n*) of the optical signal SG30-*n* to notify the control apparatus of the measured level, and the measurement detection unit 451-*n* measures the optical signal level M1(*n*) of the optical signal SG31-*n* and notifies the control apparatus of the measured level. When M0(*n*)≤P(n) or M0(*n*)<P(n) is satisfied, the control apparatus outputs the switching instruction SG50 for switching to the 1-system to the switching unit 460, and when M1(*n*)≤P(n) or M1(*n*)<P(n) is satisfied, the control apparatus outputs the switching instruction SG51 for switching to the 0-system to the switching unit 460.

Note that in order to compensate for level reduction due to branching or demultiplexing, the signal selection unit 400 may include a level adjustment unit (AMP) 480 that amplifies a multiplexed signal between the branching unit 420 and the demultiplexing unit 430, between the branching unit 420 and the switching unit 460, between the branching unit 421 and the demultiplexing unit 431, or between the branching unit 421 and the switching unit 460.

The present embodiment has a structure somewhat more complex than that of the first embodiment, but a main signal is not demultiplexed and multiplexed, so that deterioration in quality of the main signal can be suppressed compared to the first embodiment.

Third Embodiment

The signal selection apparatus according to the first embodiment demultiplexes the 0-system and 1-system multiplexed signals, and compares an optical signal level of each wavelength obtained by demultiplexing to a threshold to detect deterioration of an optical signal. A signal selection apparatus according to a present embodiment detects deterioration of an optical signal based on an optical signal level difference between adjacent wavelengths.

If the optical signal level difference between adjacent wavelengths deviates from a range of specified values, a quality of a weaker optical signal may decrease. Thus, in the present embodiment, a threshold $B_{ij}$ (i and j are each an integer of 1 or greater and N or less) is provided for an optical signal level difference between the ith wavelength and the jth wavelength adjacent to each other. The signal selection apparatus performs switching between a 0-system multiplexed signal and a 1-system multiplexed signal to be output based on comparison between a measurement value $D_{ij}$ (i and j are each an integer of 1 or greater and N or less) of an optical signal level difference between the two adjacent wavelengths and the threshold $B_{ij}$. Hereinafter, in the present embodiment, differences from the first embodiment will be mainly described.

Figure 5:
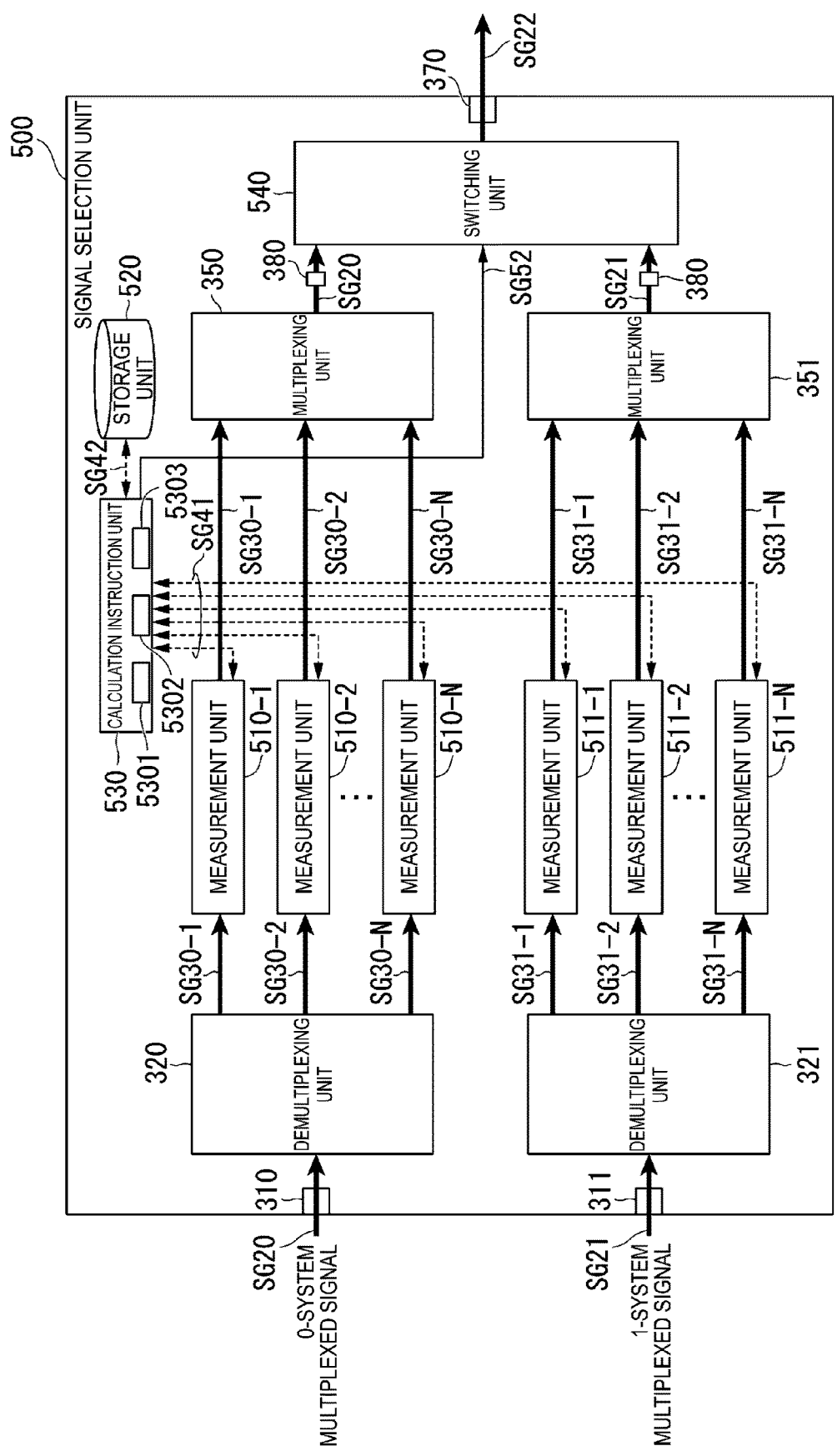
FIG. 5 is a diagram illustrating a configuration example of a signal selection unit according to a third embodiment.

FIG. 5 is a diagram illustrating a detailed configuration of a signal selection unit 500 according to the present embodiment. The signal selection unit 500 illustrated in FIG. 5 is used as the signal selection unit 263 included in the signal selection apparatus 260 illustrated in FIG. 2. In FIG. 5, the same portions as those of the signal selection unit 300 according to the first embodiment illustrated in FIG. 3 are denoted by the same reference numerals and signs, and description thereof will be omitted. The signal selection unit 500 includes an optical input unit 310, an optical input unit 311, a demultiplexing unit 320, a demultiplexing unit 321, measurement units 510-1 to 510-N (N is an integer of two or greater), measurement units 511-1 to 511-N, a storage unit 520, a calculation instruction unit 530, a multiplexing unit 350, a multiplexing unit 351, a switching unit 540, and an optical output unit 370.

The demultiplexing unit 320 outputs an optical signal SG30-*n* (n is an integer of 1 or greater and N or less) obtained by demultiplexing a 0-system multiplexed signal SG20 input from the optical input unit 310 to the measurement unit 510-*n*. The demultiplexing unit 321 outputs an optical signal SG31-*n* (n is an integer of 1 or greater and N or less) obtained by demultiplexing a 1-system multiplexed signal SG20 input from the optical input unit 311 to the measurement unit 511-*n*.

The measurement unit 510-*n* measures an optical signal level M0(*n*) of the input optical signal SG30-*n*, and outputs the optical signal SG30-*n* after measurement to the multiplexing unit 350. The measurement unit 510-*n* notifies the calculation instruction unit 530 of the measured optical signal level M0(*n*) by a control signal SG41. The measurement unit 511-*n* measures an optical signal level M1(*n*) of the input optical signal SG31-*n*, and outputs the optical signal SG31-*n* after measurement to the multiplexing unit 351. The measurement unit 511-*n* notifies the calculation instruction unit 530 of the measured optical signal level M1($n$) by the control signal SG41.

The storage unit 520 stores a setting table. The setting table indicates the threshold $B_{ij}$ (i and j are each an integer of 1 or greater and N or less) of the optical signal level difference between two wavelengths of the i-th wavelength and the j-th wavelength adjacent to each other. The calculation instruction unit 530 reads information from the storage unit 520 by a control signal SG42.

The calculation instruction unit 530 receives notification of optical signal levels M0(1) to M0(N) of the respective wavelengths from the measurement units 510-1 to 510-N, and receives notification of optical signal levels M1(1) to M1(N) of the respective wavelengths from the measurement units 511-1 to 511-N, by the control signal SG41. The calculation instruction unit 530 includes a calculation unit 5301, a detection unit 5302, and an instruction unit 5303. The calculation unit 5301, by using the optical signal levels M0(1) to M0(N), calculates a level difference $D0_{ij}$ (=M0($i$)−M0($j$)) between optical signal levels of a wavelength i and a wavelength j adjacent to each other for the 0-system. The detection unit 5302 reads the threshold $B_{ij}$ from the setting table stored in the storage unit 520 and compares the threshold to the level difference DN. The detection unit 5302 detects deterioration in quality of the 0-system when any level difference $D0_{ij}$ is greater than or equal to the threshold $B_{ij}$ ($D0_{ij} \geq B_{ij}$), or when any level difference $D0_{ij}$ is equal to or smaller than the threshold $B_{ij}$ ($D0_{ij} \leq B_{ij}$). The detection unit 5302 may detect deterioration in quality of the 0-system when any level difference $D0_{ij}$ is greater than the threshold $B_{ij}$ ($D0_{ij} > B_{ij}$), or when any level difference $D0_{ij}$ is smaller than the threshold $B_{ij}$ ($D0_{ij} < B_{ij}$). When the detection unit 5302 detects deterioration in quality of the 0-system, the instruction unit 5303 outputs a switching instruction SG52 for switching to the 1-system to the switching unit 540.

The calculation instruction unit 530 performs processing similar to that of the 0-system for the 1-system. In other words, the calculation unit 5301, by using the optical signal levels M1(1) to M1(N), calculates a level difference $D1_{ij}$ (=M1($i$)−M1($j$)) of optical signal levels of a wavelength i and a wavelength j adjacent to each other. The detection unit 5302 compares the threshold $B_{ij}$ to the level difference $D1_{ij}$. The detection unit 5302 detects deterioration in quality of the 1-system when any level difference $D1_{ij}$ is greater than or equal to the threshold $D1_{ij}$ ($D1_{ij} \geq B_{ij}$), or when any level difference $D1_{ij}$ is equal to or smaller than the threshold $B_{ij}$ ($D1_{ij} \leq B_{ij}$). The detection unit 5302 may detect deterioration in quality of the 1-system when any level difference $D1_{ij}$ is greater than the threshold $B_{ij}$ ($D1_{ij} > B_{ij}$), or when any level difference $D1_{ij}$ is smaller than the threshold $B_{ij}$ ($D1_{ij} < B_{ij}$). When the detection unit 5302 detects deterioration in quality of the 1-system, the instruction unit 5303 outputs a switching instruction SG52 for switching to the 0-system to the switching unit 540.

Note that which is an appropriate condition for detecting deterioration in quality, a case where the level differences $D0_{ij}$, $D1_{ij}$ are greater than or equal to $B_{ij}$ or greater than $B_{ij}$, or a case where the level differences $D0_{ij}$, $D1_{ij}$ are equal to or smaller than the threshold $B_{ij}$ or smaller than the threshold $B_{ij}$, varies depending on an appropriate optical signal level for a service transmitted by each wavelength, and the like.

The multiplexing unit 350 outputs a multiplexed signal SG20 obtained by multiplexing the optical signals SG30-1 to SG30-N output from the measurement units 510-1 to 510-N to the switching unit 540. The multiplexing unit 351 outputs a multiplexed signal SG21 obtained by multiplexing the optical signals SG31-1 to SG31-N output from the measurement units 511-1 to 511-N to the switching unit 540.

When receiving the switching instruction SG52 for switching to the 1-system from the calculation instruction unit 530, the switching unit 540 selects the multiplexed signal SG21 and outputs the selected multiplexed signal SG21 to the optical output unit 370, and when receiving the switching instruction SG52 for switching to the 0-system from the calculation instruction unit 530, the switching unit 540 selects the multiplexed signal SG20 and outputs the selected multiplexed signal SG20 to the optical output unit 370. The optical output unit 370 outputs the multiplexed signal SG20 or the multiplexed signal SG21 output from the switching unit 540 as a multiplexed signal SG22 to a subsequent stage.

Note that the storage unit 520 may be provided in an apparatus outside the signal selection apparatus 260, or may be provided outside the signal selection unit 500 in the signal selection apparatus 260. The storage unit 520 and the calculation instruction unit 530 may be included in an apparatus outside the signal selection unit 300 or the signal selection apparatus 260. For example, an external control apparatus that monitors and controls the video communication network system 100 or the optical transmission system 200 may have the storage unit 520 and the calculation instruction unit 530.

Note that in order to compensate for level reduction due to demultiplexing or multiplexing, the signal selection unit 500 may include a level adjustment unit (AMP) 380 that amplifies a multiplexed signal between the multiplexing unit 350 and the switching unit 540 and between the multiplexing unit 351 and the switching unit 540.

Fourth Embodiment

The signal selection apparatus according to the third embodiment demultiplexes a main signal to be output to a subsequent stage, performs level measurement, and then multiplexes the demultiplexed signals. Similarly to the second embodiment, a signal selection apparatus according to a present embodiment branches an input multiplexed signal and demultiplexes the branched multiplexed signal to perform level measurement. Hereinafter, in the present embodiment, differences from the second embodiment will be mainly described.

Figure 6:
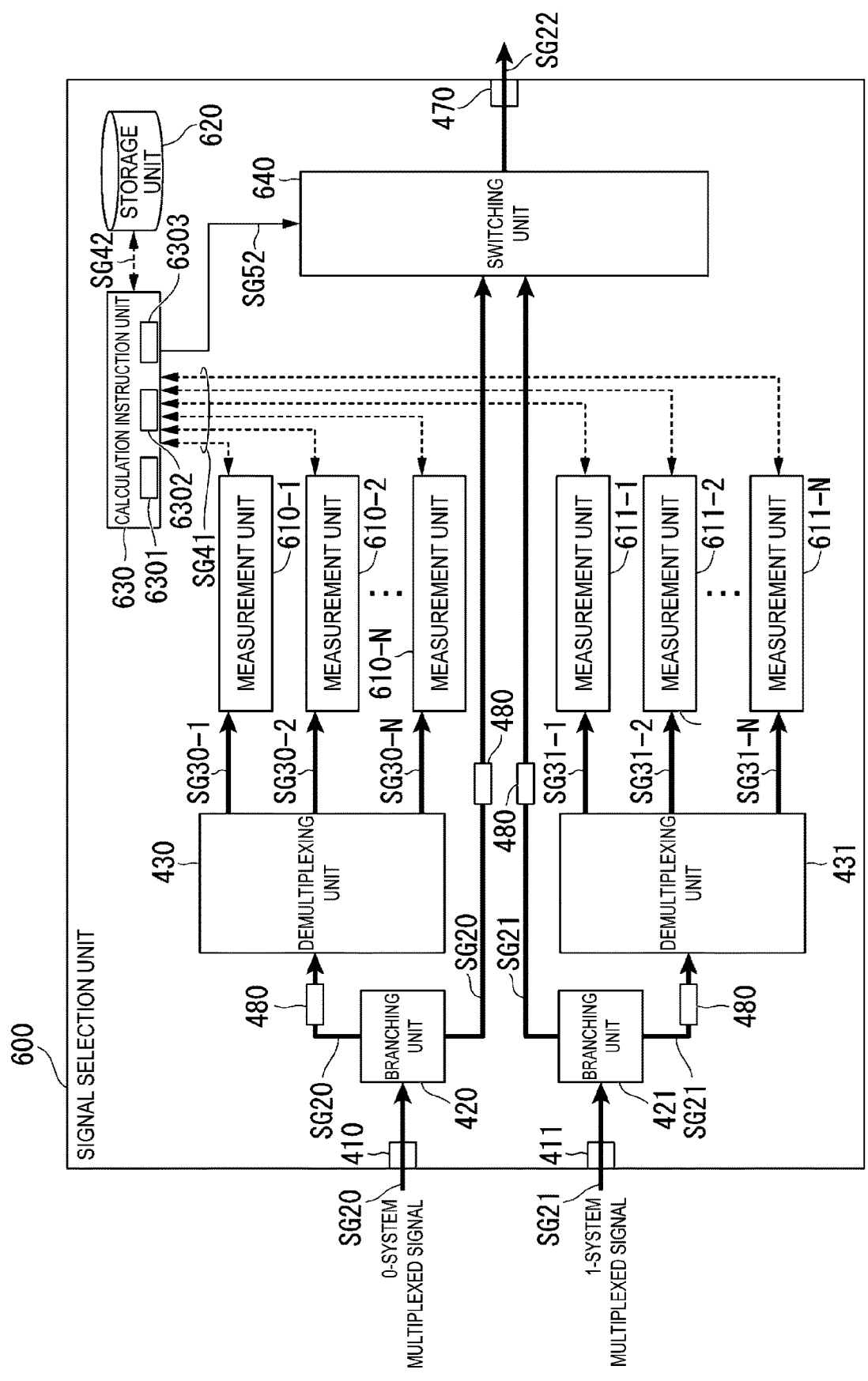
FIG. 6 is a diagram illustrating a configuration example of a signal selection unit according to a fourth embodiment.

FIG. 6 is a diagram illustrating a detailed configuration of a signal selection unit 600 according to the present embodiment. The signal selection unit 600 illustrated in FIG. 6 is used as the signal selection unit 263 included in the signal selection apparatus 260 illustrated in FIG. 2. The signal selection unit 600 includes an optical input unit 410, an optical input unit 411, a branching unit 420, a branching unit 421, a demultiplexing unit 430, a demultiplexing unit 431, measurement units 610-1 to 610-N (N is an integer of 2 or greater), measurement units 611-1 to 611-N, a storage unit 620, a calculation instruction unit 630, a switching unit 640, and an optical output unit 470.

The demultiplexing unit 430 outputs an optical signal SG30-$n$ ($n$ is an integer of 1 or greater and N or less) obtained by demultiplexing a 0-system multiplexed signal SG20 branched by the branching unit 420 to the measurement unit 610-$n$. The demultiplexing unit 431 outputs an optical signal SG30-$n$ ($n$ is an integer of 1 or greater and N or less) obtained by demultiplexing a 1-system multiplexed signal SG21 branched by the branching unit 421 to the measurement unit 611-$n$.

The measurement unit 610-$n$ measures an optical signal level M0($n$) of the input optical signal SG30-$n$, and notifies the calculation instruction unit 630 of the measured optical signal level M0($n$) by a control signal SG41. The measurement unit 611-$n$ measures an optical signal level M1($n$) of the input optical signal SG31-$n$, and outputs the measured optical signal level M1($n$) to the calculation instruction unit 630 by the control signal SG41.

The storage unit 620 stores a setting table similar to that of the storage unit 520 of the third embodiment. The setting table indicates a threshold $B_{ij}$ (i and j are each an integer of 1 or greater and N or less) of an optical signal level difference between two wavelengths of the i-th wavelength and the j-th wavelength adjacent to each other. The calculation instruction unit 630 reads information from the storage unit 620 by a control signal SG42.

The calculation instruction unit 630 performs processing similar to that of the calculation instruction unit 530 of the third embodiment. The calculation instruction unit 630 includes a calculation unit 6301, a detection unit 6302, and an instruction unit 6303. The calculation unit 6301, by using optical signal levels M0(1) to M0(N) of which are notified by the measurement units 610-1 to 610-N, calculates a level difference $D0_{ij}$ (=M0($i$)−M0($j$)) of optical signal levels of a wavelength i and a wavelength j adjacent to each other. The detection unit 6302 compares a threshold $B_{ij}$ read from the setting table to the level difference $D0_{ij}$, and detects deterioration in quality of the 0-system when any level difference $D0_{ij}$ is greater than or equal to the threshold $B_{ij}$ ($D0_{ij} \geq B_{ij}$), or when any level difference $D0_{ij}$ is equal to or smaller than the threshold $B_{ij}$ ($D0_{ij} \leq B_{ij}$). The detection unit 6302 may detect deterioration in quality of the 0-system when any level difference $D0_{ij}$ is greater than the threshold $B_{ij}$ ($D0_{ij} > B_{ij}$), or when any level difference $D0_{ij}$ is smaller than the threshold $B_{ij}$ ($D0_{ij} < B_{ij}$). When the detection unit 6302 detects deterioration in quality of the 0-system, the instruction unit 6303 outputs a switching instruction SG52 for switching to the 1-system to the switching unit 460.

The calculation instruction unit 630 performs processing similar to that of the 0-system for the 1-system. In other words, the calculation unit 6301, by using the optical signal levels M1(1) to M1(N), calculates a level difference $D1_{ij}$ (=M1($i$)−M1($j$)) between optical signal levels of a wavelength i and a wavelength j adjacent to each other. The detection unit 6302 detects deterioration in quality of the 1-system when any level difference $D1_{ij}$ is greater than or equal to the threshold $B_{ij}$ ($D1_{ij} \geq B_{ij}$), or when any level difference $D1_{ij}$ is equal to or smaller than the threshold $B_{ij}$ ($D1_{ij} \leq B_{ij}$). The detection unit 6302 may detect deterioration in quality of the 1-system when any level difference $D1_{ij}$ is greater than the threshold $B_{ij}$ ($D1_{ij} > B_{ij}$), or when any level difference $D1_{ij}$ is smaller than the threshold $B_{ij}$ ($D1_{ij} < B_{ij}$). When the detection unit 6302 detects deterioration in quality of the 1-system, the instruction unit 6303 outputs the switching instruction SG52 for switching to the 0-system to the switching unit 640.

When receiving the switching instruction SG52 for switching to the 1-system from the calculation instruction unit 630, the switching unit 640 selects the multiplexed signal SG21 and outputs the selected multiplexed signal SG21 to the optical output unit 470, and when receiving the switching instruction SG52 for switching to the 0-system from the calculation instruction unit 630, the switching unit 640 selects the multiplexed signal SG20 to output the selected multiplexed signal SG20 to the optical output unit 470. The optical output unit 470 outputs the multiplexed signal SG20 or the multiplexed signal SG21 output from the switching unit 640 as a multiplexed signal SG22 to a subsequent stage.

Note that the storage unit 620 may be provided in an apparatus outside the signal selection apparatus 260, or may be provided outside the signal selection unit 600 in the signal selection apparatus 260. The storage unit 620 and the calculation instruction unit 630 may be included in an apparatus outside the signal selection unit 600 or the signal selection apparatus 260. For example, an external control apparatus that monitors and controls the video communication network system 100 or the optical transmission system 200 may have the storage unit 620 and the calculation instruction unit 630.

Note that in order to compensate for level reduction due to branching or demultiplexing, the signal selection unit 600 may include a level adjustment unit (AMP) 480 that amplifies a multiplexed signal between the branching unit 420 and the demultiplexing unit 430, between the branching unit 420 and the switching unit 460, between the branching unit 421 and the demultiplexing unit 431, and between the branching unit 421 and the switching unit 460.

Typically, a multiplexed signal subjected to multiplexing performed to transmit a plurality of signals through one optical fiber is not demultiplexed until signal transmission in the optical transmission system is completed. This signal transmission completion means, for example, until signal transmission of an access section is completed, that is, until the ONU receives signals. This is for avoiding deterioration in signal quality and complexity of an internal structure of an apparatus that performs transmission in the optical transmission system due to the demultiplexing processing.

The signal selection apparatus according to the present embodiment achieves an improvement in switching accuracy by demultiplexing a multiplexed optical signal into optical signals having original wavelengths internally and then performing level measurement. Alternatively, the signal selection apparatus according to the present embodiment branches a signal for measurement, and demultiplexes the branched optical signal into optical signals having original wavelengths to measure a level so as not to affect original signal transmission itself. Furthermore, the signal selection apparatus has a configuration in which amplification is performed by level adjustment to prevent signal level reduction due to branching, so that it is possible to perform main signal transmission without impairing original signal transmission quality.

In addition, the signal selection apparatus may have a structure in which a main signal lead wire and a lead wire for measuring and detecting are further branched by the branching unit to suppress deterioration of a main signal, or a structure in which measurement and detection are performed by a level difference among a plurality of wavelengths as a countermeasure when an optical output level is kept constant.

According to the above-described embodiments, it is possible to transmit a multiplexed signal obtained by multiplexing optical signals having different wavelengths to a subsequent stage with good quality. Thus, when the present embodiments are applied to transmission of a video signal, video watched by a viewer can be difficult to interrupt. In addition, an accuracy of switching determination of the transmission signal can be improved, so that it is possible to suppress unnecessary signal switching processing.

According to the above-described embodiments, the optical transmission apparatus includes an optical input unit, a demultiplexing unit, a measurement unit, and a switching unit. The optical input unit inputs a first multiplexed signal obtained by multiplexing a plurality of optical signals having different wavelengths and a second multiplexed signal obtained by multiplexing a plurality of the optical signals having different wavelengths. The demultiplexing unit demultiplexes the first multiplexed signal and the second multiplexed signal by wavelength. The measurement unit measures qualities of a plurality of optical signals obtained by demultiplexing the first multiplexed signal and qualities of a plurality of optical signals obtained by demultiplexing the second multiplexed signal. The switching unit performs switching between the first multiplexed signal and the second multiplexed signal to be output to a subsequent stage based on a result of measurement by the measurement unit.

The optical transmission apparatus may further include a multiplexing unit configured to perform processing of multiplexing a plurality of optical signals obtained by demultiplexing the first multiplexed signal after measurement by the measurement unit and outputting the multiplexed signal to the switching unit, and processing of demultiplexing a plurality of optical signals obtained by demultiplexing the second multiplexed signal after measurement by the measurement unit and outputting demultiplexed signals to the switching unit.

The optical transmission apparatus may further include a branching unit configured to perform processing of branching the first multiplexed signal input by the input unit and outputting the branched first multiplexed signal to the demultiplexing unit and the switching unit, and processing of branching the second multiplexed signal input by the input unit and outputting the branched second multiplexed signal to the demultiplexing unit and the switching unit.

The optical transmission apparatus may further include an instruction unit configured to instruct the switching unit to output the second multiplexed signal when a level of any of a plurality of optical signals obtained by demultiplexing the first multiplexed signal satisfies a condition indicating deterioration in quality, and instruct the switching unit to output the first multiplexed signal when a level of any of a plurality of optical signals obtained by demultiplexing the second multiplexed signal satisfies the condition indicating deterioration in quality.

The optical transmission apparatus may further include an instruction unit configured to instruct the switching unit to output the second multiplexed signal when a level difference between optical signals having adjacent wavelengths satisfies a condition indicating deterioration in quality among a plurality of optical signals obtained by demultiplexing the first multiplexed signal, and instruct the switching unit to output the first multiplexed signal when a level difference between optical signals having adjacent wavelengths satisfies the condition indicating deterioration in quality among a plurality of optical signals obtained by demultiplexing the second multiplexed signal.

Although embodiments of the present invention have been described above in detail with reference to the drawings, the specific configurations thereof are not limited to those of the embodiments and also include designs or the like without departing from the spirit of the present invention.

REFERENCE SIGNS LIST 100, 900 Video communication network system
110, 111, 910, 911 Transmitter
120, 150, 930 WDM filter
130, 140, 920, 921 Transmission apparatus
160, 940 Access network
170, 171, 950, 951 Receiver
200 Optical transmission system
210, 211 Head end
220, 221, 230, 231 Optical transmission unit
240, 241, 350, 351 Multiplexing unit
245, 246 Transmission line
250, 251, 261, 262 Amplification-for-relay unit
260 Signal selection apparatus
263, 300, 400, 500, 600, 980 Signal selection unit
270 Amplification unit
280 Distribution unit
290 Optical reception unit
310, 311, 410, 411, 981, 982 Optical input unit
320, 321, 430, 431 Demultiplexing unit
330, 440, 520, 620 Storage unit
340-1 to 340-N, 341-1 to 341-N, 450-1 to 450-N, 451-1 to 451-N Measurement detection unit
360, 460, 540, 640, 985 Switching unit
370, 470, 986 Optical output unit
380, 480 Level adjustment unit
420, 421 Branching unit
510-1 to 510-N, 511-1 to 511-N, 610-1 to 610-N, 611-1 to 611-N, 3401, 3411, 4501, 4511 Measurement unit
530, 630 Calculation instruction unit
983, 984, 3402, 3412, 4502, 4512, 5302, 6302 Detection unit
3403, 3413, 4503, 4513, 5303, 6303 Instruction unit
5301, 6301 Calculation unit

The invention claimed is:

1. An optical transmission apparatus comprising:
an optical input unit configured to input a first multiplexed signal obtained by multiplexing a plurality of optical signals having different wavelengths and a second multiplexed signal obtained by multiplexing a plurality of optical signals having different wavelengths:
a demultiplexing unit configured to demultiplex the first multiplexed signal and the second multiplexed signal by wavelength;
a processor;
a storage medium having computer program instructions stored thereon, when executed by the processor, perform to measure qualities of a plurality of optical signals obtained by the demultiplexing of the first multiplexed signal and qualities of a plurality of optical signals obtained by the demultiplexing of the second multiplexed signal; and switching between the first multiplexed signal and the second multiplexed signal to be output to a subsequent stage based on a result of measurement; and
a multiplexing unit configured to multiplex the plurality of optical signals obtained by the demultiplexing of the first multiplexed signal and outputting a multiplexed signal, and demultiplex the plurality of optical signals obtained by the demultiplexing of the second multiplexed signal and outputting demultiplexed signals.

2. The optical transmission apparatus according to claim 1, further comprising
a branching unit configured to branch the first multiplexed signal input by the optical input unit and outputting the branched first multiplexed signal to the demultiplexing unit and the switching unit, and branching the second multiplexed signal input by the optical input unit and outputting the branched second multiplexed signal to the demultiplexing unit and the switching unit.

3. The optical transmission apparatus according to claim 1, wherein the computer program instructions further perform to instruct the switching unit to output the second multiplexed signal when a level of any of a plurality of the optical signals obtained by the demultiplexing the first multiplexed signal by the demultiplexing unit satisfies a condition indicating deterioration in quality, and instruct the switching unit to output the first multiplexed signal when a level of any of a plurality of the optical signals obtained by the demultiplexing the second multiplexed signal by the demultiplexing unit satisfies the condition indicating deterioration in quality.

4. The optical transmission apparatus according to claim 1, wherein the computer program instructions further perform to instruct a switching unit to output the second multiplexed signal when a level difference between the optical signals having wavelengths adjacent to each other satisfies a condition indicating deterioration in quality among a plurality of the optical signals obtained by the demultiplexing the first multiplexed signal by the demultiplexing unit, and instruct the switching unit to output the first multiplexed signal when a level difference between the optical signals having wavelengths adjacent to each other satisfies the condition indicating deterioration in quality among a plurality of the optical signals obtained by the demultiplexing the second multiplexed signal by the demultiplexing unit.

5. The optical transmission apparatus according to claim 1, further comprising
an amplification unit configured to amplify the first multiplexed signal and the second multiplexed signal.

6. An optical transmission method comprising:
inputting a first multiplexed signal obtained by multiplexing a plurality of optical signals having different wavelengths and a second multiplexed signal obtained by multiplexing a plurality of the optical signals having different wavelengths;
demultiplexing the first multiplexed signal and the second multiplexed signal by wavelength;
measuring qualities of a plurality of optical signals obtained by the demultiplexing the first multiplexed signal and qualities of a plurality of optical signals obtained by the demultiplexing the second multiplexed signal; and
performing switching between the first multiplexed signal and the second multiplexed signal to be output to a subsequent stage based on a result of measurement by the measuring,
wherein the second multiplexed signal is output when a level difference between the optical signals having wavelengths adjacent to each other satisfies a condition indicating deterioration in quality among a plurality of the optical signals obtained by the demultiplexing the first multiplexed signal, and the first multiplexed signal is output when a level difference between the optical signals having wavelengths adjacent to each other satisfies the condition indicating deterioration in quality among a plurality of the optical signals obtained by the demultiplexing the second multiplexed signal.

7. An optical transmission apparatus comprising:
an optical input configured to input a first multiplexed signal obtained by multiplexing a plurality of optical signals having different wavelengths and a second multiplexed signal obtained by multiplexing a plurality of optical signals having different wavelengths:
a demultiplexer configured to demultiplex the first multiplexed signal and the second multiplexed signal by wavelength;
a processor; and
a storage medium having computer program instructions stored thereon, when executed by the processor, perform to measure qualities of a plurality of optical signals obtained by the demultiplexing of the first multiplexed signal and qualities of a plurality of optical signals obtained by the demultiplexing of the second multiplexed signal; and switching between the first multiplexed signal and the second multiplexed signal to be output to a subsequent stage based on a result of measurement;
wherein the computer program instructions further perform to instruct a switch to output the second multiplexed signal when a level difference between the optical signals having wavelengths adjacent to each other satisfies a condition indicating deterioration in quality among a plurality of the optical signals obtained by the demultiplexing the first multiplexed signal by the demultiplexer, and instruct the switch to output the first multiplexed signal when a level difference between the optical signals having wavelengths adjacent to each other satisfies the condition indicating deterioration in quality among a plurality of the optical signals obtained by the demultiplexing the second multiplexed signal by the demultiplexer.

8. The optical transmission apparatus according to claim 7 further comprises a multiplexer configured to multiplex the plurality of optical signals obtained by the demultiplexing of the first multiplexed signal and outputting a multiplexed signal, and demultiplex the plurality of optical signals obtained by the demultiplexing of the second multiplexed signal and outputting demultiplexed signals.

9. The optical transmission apparatus according to claim 7, further comprises splitter configured to branch the first multiplexed signal input by the optical input and outputting the branched first multiplexed signal to the demultiplexer and the switch, and branching the second multiplexed signal input by the optical input and outputting the branched second multiplexed signal to the demultiplexer and the switch.

10. The optical transmission apparatus according to claim 7, wherein the computer program instructions further perform to instruct the switch to output the second multiplexed signal when a level of any of a plurality of the optical signals obtained by the demultiplexing the first multiplexed signal by the demultiplexer satisfies a condition indicating deterioration in quality, and instruct the switch to output the first multiplexed signal when a level of any of a plurality of the optical signals obtained by the demultiplexing the second multiplexed signal by the demultiplexer satisfies the condition indicating deterioration in quality.

* * * * *